(12) United States Patent
Chang

(10) Patent No.: US 7,170,649 B2
(45) Date of Patent: Jan. 30, 2007

(54) SCANNING MODULE HAVING AN ADJUSTABLE HEIGHT

(75) Inventor: Martin Chang, Hsin-Chu (TW)

(73) Assignee: Avision Inc., Hsinchu (TW)

( * ) Notice: Subject to any disclaimer, the term of this patent is extended or adjusted under 35 U.S.C. 154(b) by 830 days.

(21) Appl. No.: 10/112,405

(22) Filed: Apr. 1, 2002

(65) Prior Publication Data

US 2003/0112478 A1 Jun. 19, 2003

(30) Foreign Application Priority Data

Dec. 19, 2001 (TW) .............................. 90222302 U

(51) Int. Cl.
*H04N 1/04* (2006.01)

(52) U.S. Cl. ...................... 358/474; 358/505; 399/126; 271/264

(58) Field of Classification Search ................ 358/474, 358/1.5, 504, 505, 496, 497; 399/126; 271/264
See application file for complete search history.

(56) References Cited

U.S. PATENT DOCUMENTS

| | | | | |
|---|---|---|---|---|
| 4,243,330 A * | 1/1981 | Wallace et al. | ............. | 400/194 |
| 4,400,071 A * | 8/1983 | Tamura et al. | ............... | 396/116 |
| 4,557,594 A * | 12/1985 | Negoro | ......................... | 355/58 |
| 6,169,622 B1 * | 1/2001 | Tsai et al. | .................... | 359/210 |
| 6,373,601 B1 * | 4/2002 | Cheng | ......................... | 358/474 |
| 6,424,434 B1 * | 7/2002 | Uchida | ....................... | 358/474 |
| 6,473,205 B1 * | 10/2002 | Pepe | ........................... | 358/483 |
| 6,603,514 B1 * | 8/2003 | Tsai et al. | .................... | 348/345 |
| 6,963,428 B1 * | 11/2005 | Gann | ......................... | 358/474 |
| 7,038,819 B2 * | 5/2006 | Fang et al. | ................. | 358/474 |
| 2002/0084401 A1 * | 7/2002 | Tsai et al. | .................... | 248/650 |

* cited by examiner

*Primary Examiner*—Douglas Q. Tran
*Assistant Examiner*—Negussie Worku

(57) ABSTRACT

A scanning module having an adjustable height includes a CIS module having two ends along a longitudinal direction each provided with a distance adjusting member. Thus, when the CIS module is scanning the reflective document and the transparency, the distance adjusting member may be adjusted to change the distance between the CIS module and the glass window for the to-be-scanned document to be placed on. Thus, under scanning of the CIS module, both of the reflective document and the transparency may obtain a clear image effect.

12 Claims, 6 Drawing Sheets

SCANNING MODULE HAVING AN ADJUSTABLE HEIGHT

BACKGROUND OF THE INVENTION

1. Field of the Invention

The present invention relates to a scanning module having an adjustable height, and more particularly to a CIS scanning module which may adjust the assembly height to satisfy the scanning requirements.

2. Description of the Related Art

A scanner may include the scanner of a CCD module and the scanner of a CIS module. The CIS module has a smaller view depth, but is easily made to satisfy the requirements of the light, thin, short and small product. Thus, the CIS module plays an important role in the market.

The CIS module has a smaller view depth. Thus, in design and fabrication, the document to be scanned is smoothly rested on the top of the glass window of the scanner, and the CIS module is closer to the glass window of the scanner, thereby obtaining the parameters of design and fabrication.

For the reflective document, the reflective document may be smoothly rested on the top of the glass window of the scanner, to satisfy the parameters of design and fabrication. Thus, the scanner of a CIS module may be used to scan the reflective document normally.

For the transparency, the negative sheet may be scanned. The negative sheet does not have an outer frame. Thus, if the negative sheet is smoothly rested on the top of the glass window of the scanner and is mated with a proper light source, the negative sheet may be scanned.

For the transparency of the positive sheet, such as the slide, the positive sheet cannot be scanned on the scanner of a conventional CIS module. Usually, the positive sheet has an outer frame which has a determined thickness. Thus, when the positive sheet is placed on the top of the glass window of the scanner, a small distance is formed between the positive sheet and the glass window of the scanner. Thus, the distance between the positive sheet and the glass window of the scanner is greater than the original parameters of design and fabrication. In addition, the CIS module has a smaller view depth. Thus, when the scanner of a conventional CIS module is scanning the positive sheet, the scanning will obtain a vague image.

In the recent market, the CIS scanner only can provide scanning of the reflective document, and the CIS scanner cannot be used to scan the transparency. Thus, the usage of the CIS scanner is limited even it may satisfy the requirements of the light, thin, short and small product.

SUMMARY OF THE INVENTION

The primary objective of the present invention is to provide a CIS scanning module that may scan the transparency exactly.

The present invention may adjust the assembly height of the CIS scanning module, to change the distance between the CIS scanning module and the glass window, thereby satisfying the required parameters of the reflective document and the transparency.

According to the primary objective of the present invention, the embodiment of the present invention is to provide a scanning module having an adjustable height, for scanning a document to be scanned that is placed on a top of a glass window of a scanner, including:

a CIS module mounted under the glass window; and at least one distance adjusting member including a seat and at least one lift unit mounted on the seat, wherein the seat is secured on the CIS module, the at least one lift unit is rested on the glass window, and can be lifted and lowered relative to the seat.

Thus, when the lift unit is lifted or lowered relative to the seat, the CIS scanning module may be apart from or approach the glass window. That is, when scanning the reflective document or the transparency that may be smoothly rested on the surface of the glass window, the lift unit may be lifted, so that a larger distance is formed between the CIS scanning module and the glass window. When scanning the transparency having an outer frame, the lift unit may be lowered, thereby reducing the distance between the CIS scanning module and the glass window.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS OF THE INVENTION

Figure 1:
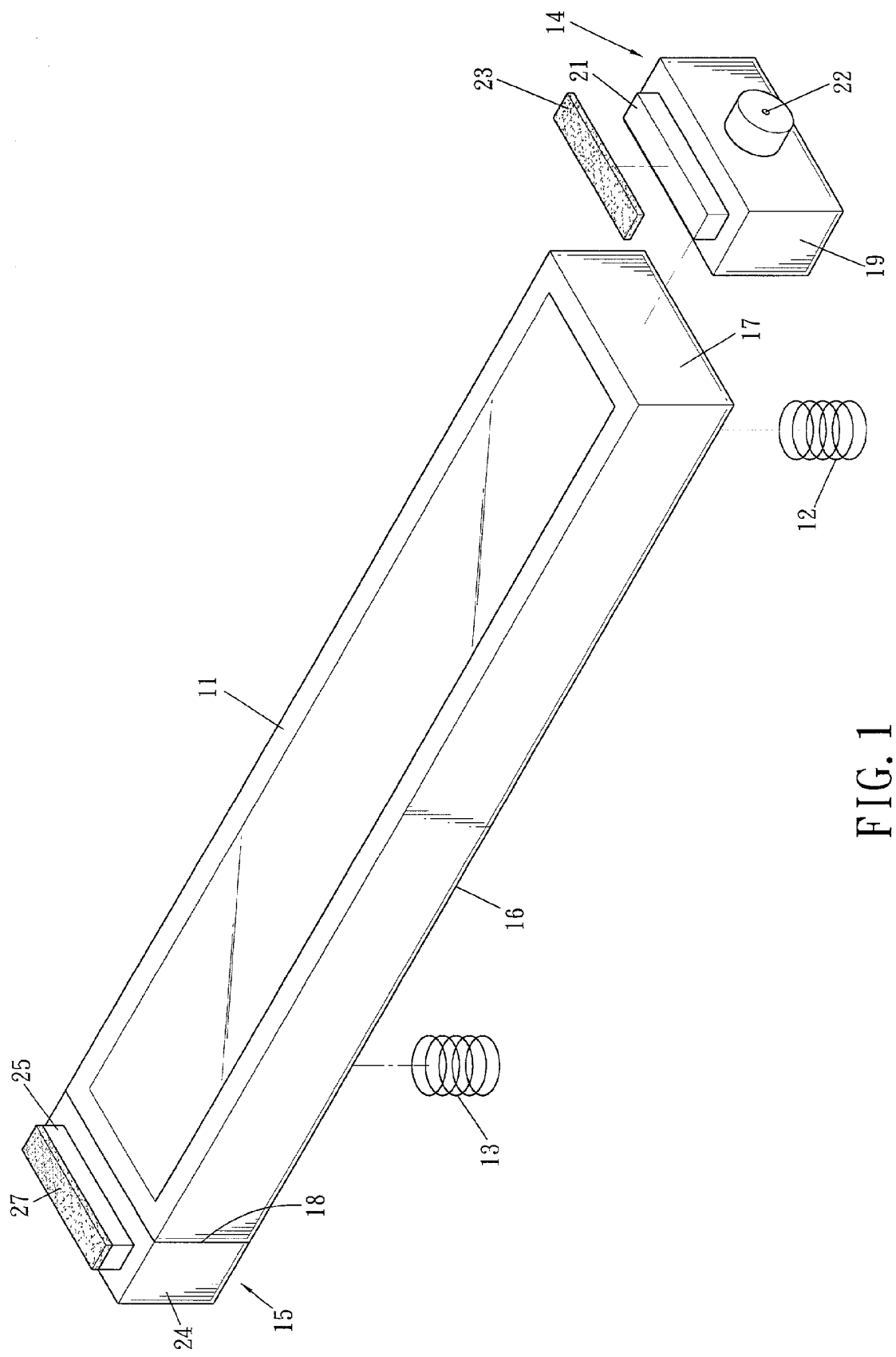
FIG. 1 is an exploded view of a scanning module having an adjustable height in accordance with a first embodiment of the present invention.

FIG. 1 is an exploded view of a scanning module having an adjustable height in accordance with a first embodiment of the present invention. The scanning module having an adjustable height in accordance with a first embodiment of the present invention includes a CIS module 11, two elastic support members 12 and 13, and two distance adjusting members 14 and 15. The CIS module 11 is conventional, and will not be further described in detail.

Each of the two elastic support members 12 and 13 may be a spring as shown in the figure. The elastic support member 12 is mounted on the bottom 16 of the CIS module 11, and is located adjacent to a first end 17 of a longitudinal direction of the CIS module 11. The elastic support member 13 is mounted on the bottom 16 of the CIS module 11, and is located adjacent to a second end 18 of a longitudinal direction of the CIS module 11.

The distance adjusting member 14 has a seat 19, and a lift unit 21 mounted on the seat 19. The lift unit 21 may be an elongated protruding block, and may be protruded outward from and retracted into the seat 19.

In the first embodiment of the present invention, the lifting and lowering actions of the lift unit 21 is controlled by a push button 22 mounted on the seat 19. The push button 22 may be pressed to protrude and lift the lift unit 21, and may be pressed again to retract and lower the lift unit 21. The structure of using the push button 22 to control the lifting and lowering actions of the lift unit 21 may be seen in the press type automatic ball-point pen. Thus, the distance adjusting member 14 is an existing part, and may be used as a distance adjusting member of the present invention.

In addition, the top of the lift unit 21 is coated with Teflon 23, for decreasing the friction resistance of the top of the lift unit 21.

The distance adjusting member 15 has a structure the same as that of the distance adjusting member 14, and has a seat 24, and a lift unit 25 mounted on the seat 24. The lift unit 25 may be controlled by a push button 26 (see FIG. 2). The top of the lift unit 25 is coated with Teflon 27, for decreasing the friction resistance of the top of the lift unit 25.

Figure 2:
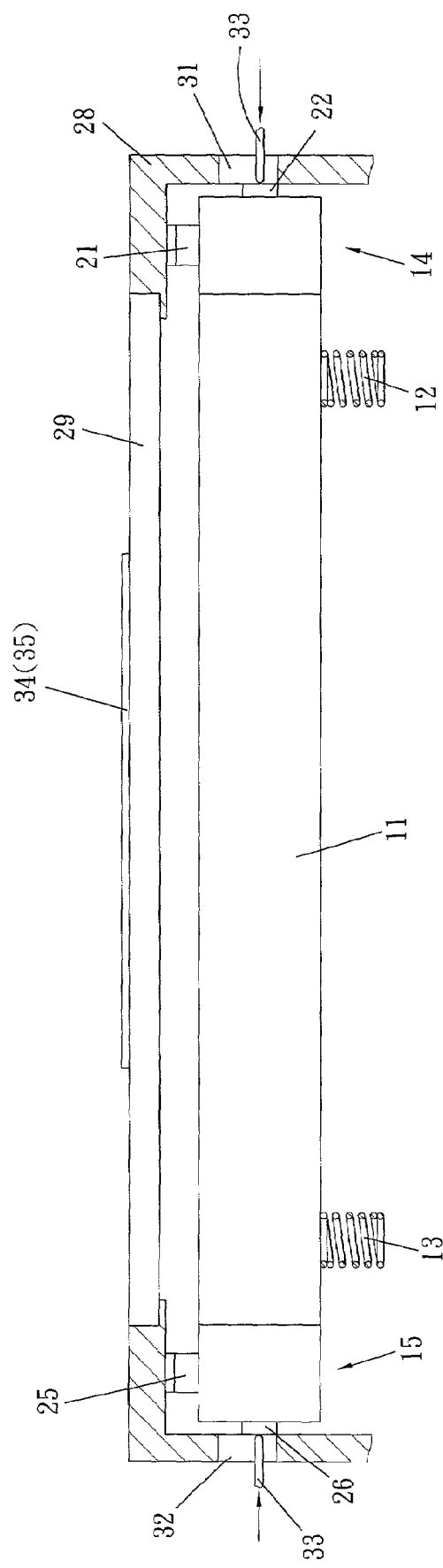
FIG. 2 is a cross-sectional assembly view of the scanning module having an adjustable height in accordance with the first embodiment of the present invention.

FIG. 2 is a cross-sectional assembly view of the scanning module having an adjustable height in accordance with a first embodiment of the present invention. As shown in FIG. 2, the assembly of the CIS module 11, the two elastic support members 12 and 13, and the two distance adjusting members 14 and 15 is mounted in the inside of a scanner body 28. The CIS module 11 is located under a glass window 29. The two elastic support members 12 and 13 may provide the push force to push the CIS module 11 toward the glass window 29. The lift units 21 and 25 of the two distance adjusting members 14 and 15 are rested on the inner surface of the scanner body 28 and located adjacent to the glass window 29. The scanner body 28 is formed with two through holes 31 and 32 which are aligned with the push buttons 22 and 26 of the two distance adjusting members 14 and 15 respectively.

The status as shown in FIG. 2 is a normal status of the scanner. At such a normal status, the CIS module 11 and the glass window 29 may maintain a larger distance, thereby capable of scanning a reflective document 34 or scanning a transparency 35 that may be smoothly rested on the surface of the glass window 29. The tools 33 may be passed through the two through holes 31 and 32 to press the push buttons 22 and 26, so that the protruded lift units 21 and 25 may be retracted.

Figure 3:
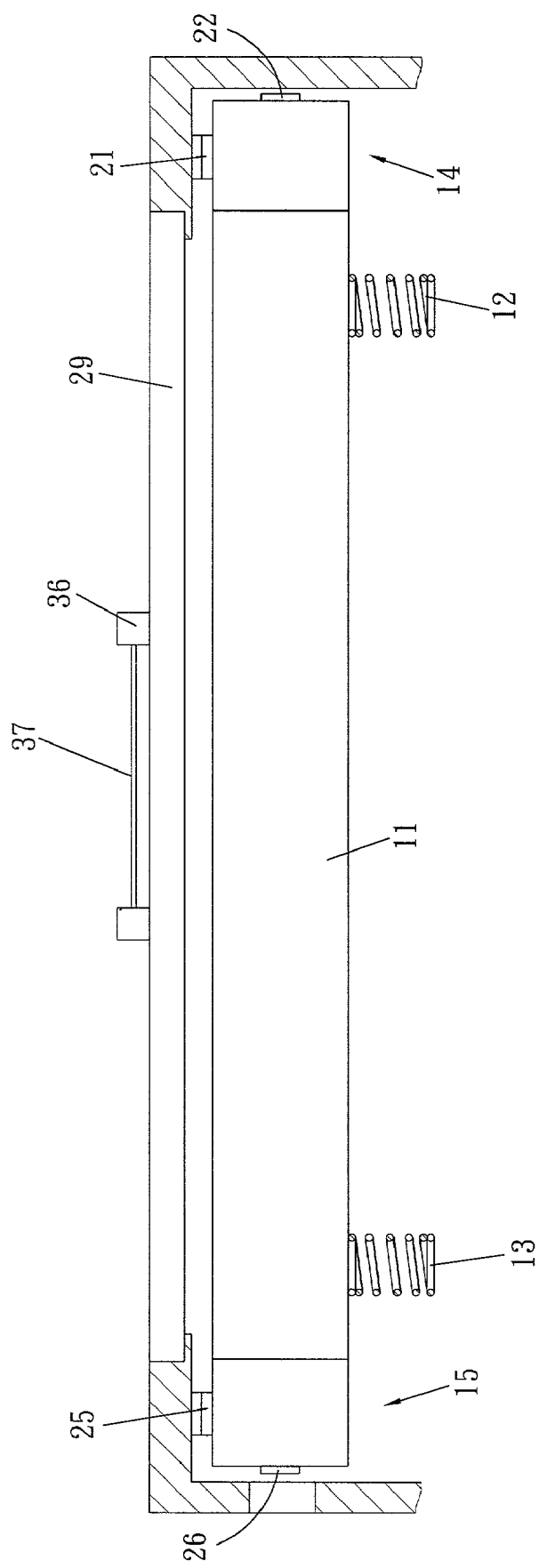
FIG. 3 is a schematic structural view of the scanning module having an adjustable height in accordance with the first embodiment of the present invention, wherein the CIS module approaches the glass window.

FIG. 3 is a schematic structural view of the scanning module having an adjustable height in accordance with a first embodiment of the present invention, wherein the CIS module 11 approaches the glass window 29. As shown in the figure, the push buttons 22 and 26 are pressed. Thus, the length of the lift units 21 and 25 is reduced, so that the two elastic support members 12 and 13 may further push the CIS module 11 toward the glass window 29. Thus, the distance between the CIS module 11 and the glass window 29 is reduced. At this time, the status as shown in the figure may be available for scanning a transparency 37 having an outer frame (holder) 36.

In practice, in FIG. 2, the distance between the reflective document 34 and the CIS module 11 is about 1.45 mm. Under this distance, the image information reflected from the reflective document 34 may achieve the predetermined length of the object distance, thereby forming a clear image. Similarly, the transparency 35 that may be smoothly rested on the surface of the glass window 29 will be scanned to obtain a clear image effect.

In FIG. 3, for eliminating the variation of the object distance caused by the thickness of the outer frame 36, the CIS module 11 is closer to the glass window 29, so that the distance between the reflective document 34 and the CIS module 11 is still about 1.45 mm. Thus, the image information formed by the light passing through the transparency 37 may achieve the predetermined length of the object distance, thereby forming a clear image when scanning the transparency 37 having an outer frame 36.

In general, the CIS module 11 is subjected to the action of the two elastic support members 12 and 13 and the two distance adjusting members 14 and 15, so that the CIS module 11 may be moved through a distance half of the thickness of the outer frame 36, thereby counteracting the distance of the transparency 37 apart from the glass window 29.

After the user presses the push buttons 22 and 26 again, the lift units 21 and 25 may be protruded again, to push the CIS module 11 apart from the glass window 29, and to compress the two elastic support members 12 and 13. Thus, the distance between the CIS module 11 and the glass window 29 may be maintained at 1.45 mm.

Figure 4:
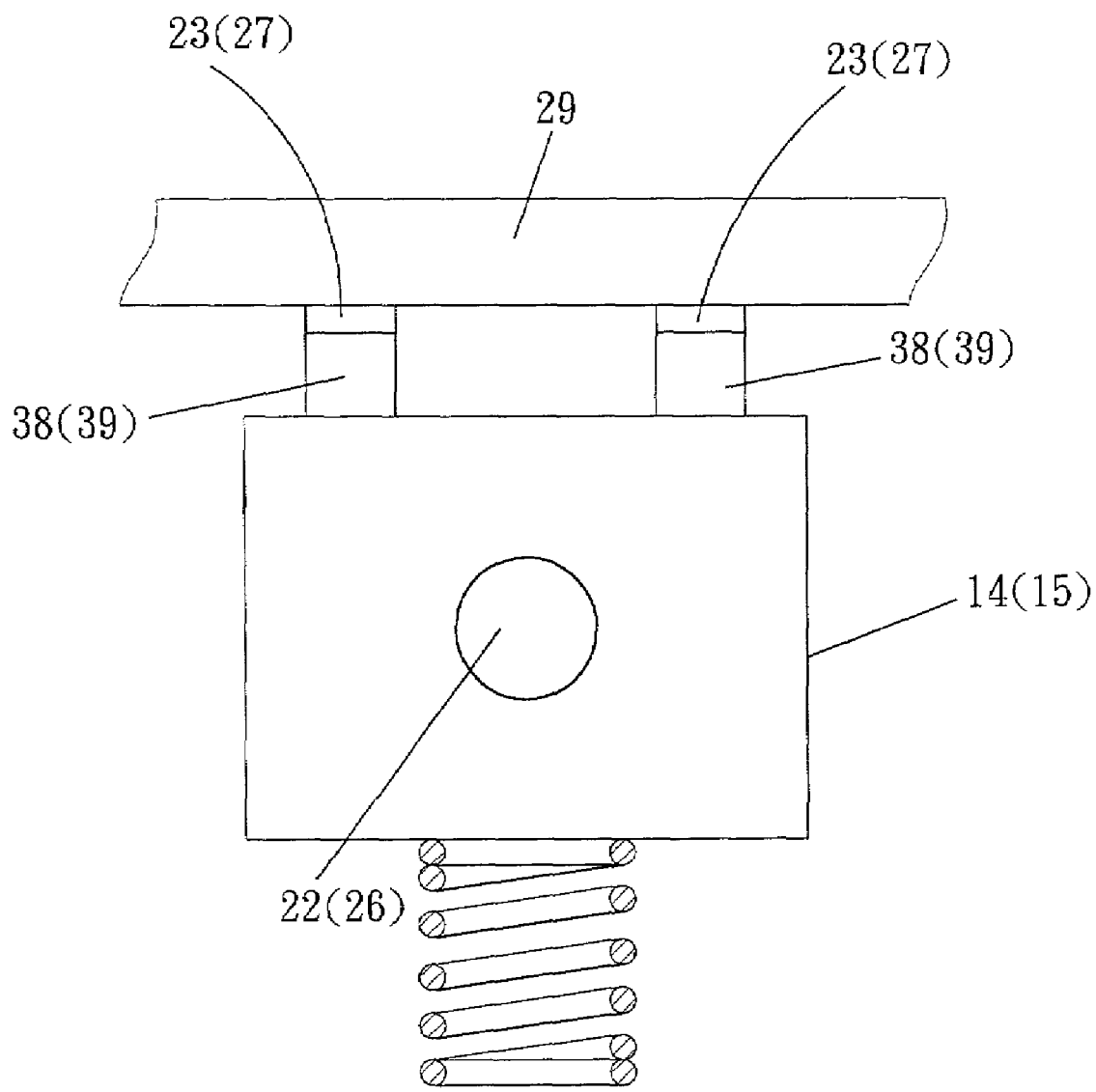
FIG. 4 is another structure of the distance adjusting members of a scanning module having an adjustable height in accordance with a second embodiment of the present invention.

FIG. 4 is another structure of the distance adjusting members 14 and 15 of a scanning module having an adjustable height in accordance with a second embodiment of the present invention. Each of the lift units 38 and 39 of the distance adjusting members 14 and 15 is a protruding post. The top of the protruding post shaped lift units 38 and 39 is provided with Teflon 23 and 27 which are rested adjacent to the glass window 29.

Adjustment of the distance adjusting members 14 and 15 may be achieved by using tools (not shown) to press the push buttons 22 and 26 as disclosed in the first embodiment. The time for adjusting the distance adjusting members 14 and 15 and the available cases are the same as those in the first embodiment, and will not be further described.

Figure 5:
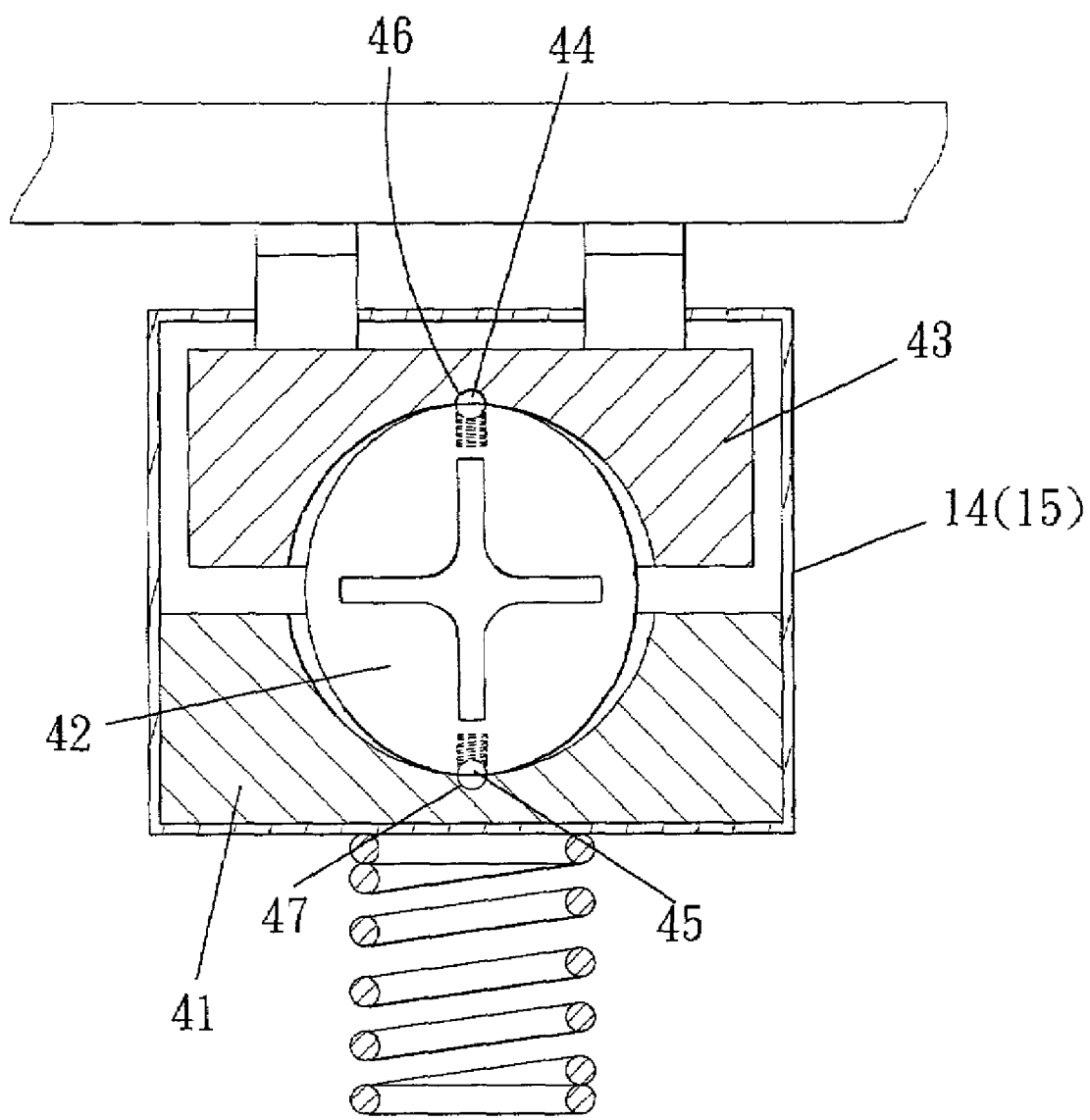
FIG. 5 is another structure of the distance adjusting members of a scanning module having an adjustable height in accordance with a third embodiment of the present invention.

FIG. 5 is another structure of the distance adjusting members 14 and 15 of a scanning module having an adjustable height in accordance with a third embodiment of the present invention. Each of the distance adjusting members 14 and 15 includes a cam seat 41, a cam 42 mounted on the cam seat 41, and a lift unit 43 driven by the cam 42.

When in use, a tool (not shown) may be used to rotate the cam 42 to drive the lift unit 43 to lift or lower. When the cam 42 is at a predetermined position, the locking bosses 44 and 45 on the cam 42 may be locked into the locking cavity 46 of the lift unit 43 and the locking cavity 47 of the cam seat 41 respectively, thereby fixing the cam 42 and the lift unit 43.

The time for adjusting the distance adjusting members 14 and 15 and the available cases are the same as those in the first embodiment, and will not be further described.

Figure 6:
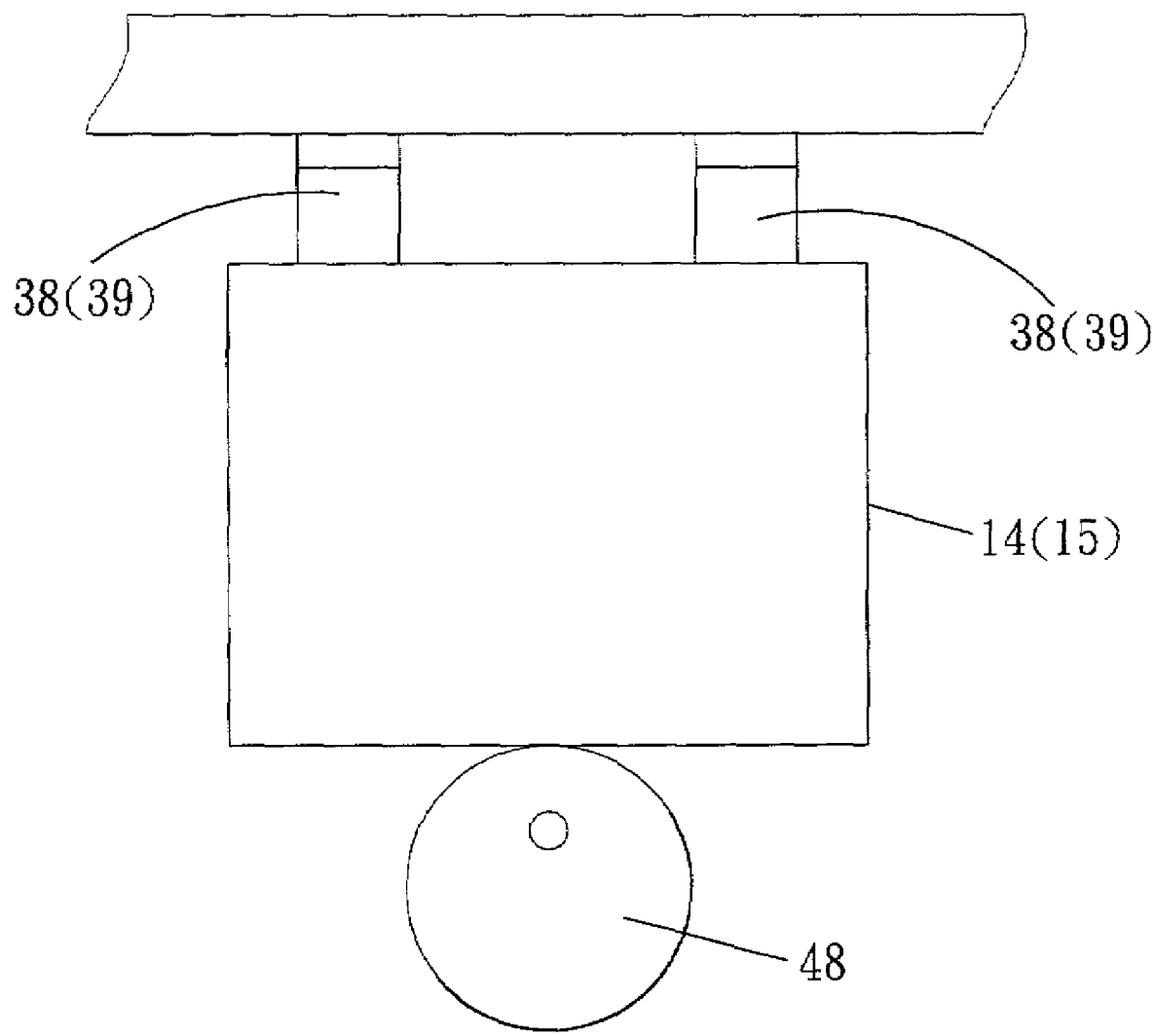
FIG. 6 is another structure of the distance adjusting members of a scanning module having an adjustable height in accordance with a fourth embodiment of the present invention.

FIG. 6 is another structure of the distance adjusting members 14 and 15 of a scanning module having an adjustable height in accordance with a fourth embodiment of the present invention. The distance adjusting members 14 and 15 are provided with lift units 38 and 39. The lift units 38 and 39 have elastic retraction functions. For example, the lift units 38 and 39 may mate with springs to have elastic retraction functions. A cam 48 is mounted on the bottom of the distance adjusting members 14 and 15. The lift units 38 and 39 of the distance adjusting members 14 and 15 may be protruded or retracted by rotation of the cam 48.

The time for adjusting the distance adjusting members 14 and 15 and the available cases are the same as those in the first embodiment, and will not be further described.

In conclusion, the lifting and lowering actions of the lift unit of the distance adjusting member may be controlled by an electromagnetic valve, a motor or a threaded rod. It is appreciated that, the electromagnetic valve needs to be powered constantly to attract continuously. But, under the situation of lack of the electric power, the electromagnetic valve needs not to be powered constantly, wherein the electromagnetic valve may be activated by applying the electric power instantaneously to switch the operation position of the electromagnetic valve.

In the scanning module having an adjustable height in accordance with the present invention, the distance adjusting member and the elastic support member may interact, to adjust the assembly height of the CIS module according to the form of the document to be scanned. Thus, the present invention may obtain a clear image after scanning the document, thereby efficiently overcoming the drawback of the scanning module of the conventional CIS scanner which is not available for scanning the transparency having an outer frame.

While the preferred embodiments of the present invention have been shown and described, it will be apparent to those skilled in the art that various modifications may be made in the embodiments without departing from the spirit of the present invention. Such modifications are all within the scope of the present invention.

What is claimed is:

1. A scanning module for scanning a to-be-scanned document that is placed on a top of a glass window of a scanner, the scanning module comprising:
   a CIS module mounted under the glass window; and
   at least one distance adjusting member including a seat and at least one lift unit mounted on the seat, wherein the seat is secured on the CIS module, and the at least one lift unit can be lifted and lowered relative to the seat such that a distance from the seat to the glass window is shortened or lengthened.

2. The scanning module in accordance with claim 1, wherein the lifting and lowering actions of the at least one lift unit of the at least one distance adjusting member is controlled by a push button.

3. The scanning module in accordance with claim 1, wherein the lifting and lowering actions of the at least one lift unit of the at least one distance adjusting member is controlled by a cam.

4. The scanning module in accordance with claim 1, further comprising a cam mounted on a bottom of the at least one distance adjusting member, for driving the at least one distance adjusting member and the CIS module to lift and lower.

5. The scanning module in accordance with claim 1, wherein the lifting and lowering actions of the at least one lift unit of the at least one distance adjusting member is controlled by an electromagnetic valve.

6. The scanning module in accordance with claim 1, wherein the lifting and lowering actions of the at least one lift unit of the at least one distance adjusting member are controlled by a motor.

7. The scanning module in accordance with claim 1, wherein the at least one lift unit of the at least one distance adjusting member is an elongated protruding block.

8. The scanning module in accordance with claim 1, wherein the at least one lift unit of the at least one distance adjusting member is a protruding post.

9. The scanning module in accordance with claim 1, wherein the at least one lift unit of the at least one distance adjusting member has a top coated with Teflon.

10. The scanning module in accordance with claim 1, wherein the at least one distance adjusting member is secured on each of two ends of a longitudinal direction of the CIS module.

11. The scanning module in accordance with claim 1, further comprising at least one elastic support member mounted on the bottom of the CIS module.

12. The scanning module in accordance with claim 1, further comprising at least one elastic support member for providing a push force to push the CIS module toward the glass window.

* * * * *